429-144 SR
FIP8011 OP RE 23,644
SEARCH ROOM

April 14, 1953 J. A. GRANT Re. 23,644

BATTERY SEPARATOR

Original Filed March 14, 1945

INVENTOR.
JOHN A. GRANT
BY
Stachin & Overman
ATTORNEYS

Reissued Apr. 14, 1953

Re. 23,644

UNITED STATES PATENT OFFICE 23,644

BATTERY SEPARATOR

John A. Grant, Granville, Ohio, assignor to Owens-Corning Fiberglas Corporation, a corporation of Delaware Original No. 2,484,787, dated October 11, 1949, Serial No. 582,654, March 14, 1945. Application for reissue October 3, 1950, Serial No. 188,255

8 Claims. (Cl. 136—145)

Matter enclosed in heavy brackets [ ] appears in the original patent but forms no part of this reissue specification; matter printed in italics indicates the additions made by reissue.

The present invention relates to storage battery plate separators or retainer mats for storage batteries formed of glass fibers and more particularly to separators formed by laminating together mats of fibers having required dielectric and chemical properties.

In the making of such separators of glass fibers, it has been found that it is preferable to form the separators from two or more thin sheets of fine glass fibers laminated together than from a single sheet of greater thickness. The porosity and density of a thin mat may be more uniformly controlled than in a mat of greater thickness and the use of selected adhesives to bond two or more thin mats together lends increased rigidity to the finished separator. Also by laminating, separators may be made from mats formed of different size fibers when special constructions are desired.

The advantages derived from laminating a plurality of fibrous mats to form the separator may be offset by the use of an adhesive material to secure the laminated mats together. An adhesive which penetrates or soaks into highly porous mats or produces an impervious coating destroys the porosity and consequently the utility of the separator.

It is the primary object of the present invention to laminate and bond together a plurality of thin mats of fibrous glass without impairing either the density or porosity of the mats. In accomplishing this, thin glass fiber mats are bonded together with an adhesive material in the form of a fibrous web.

It is another object of the invention to produce battery separators by laminating thin mats of glass fibers in a continuous operation. This is accomplished by bringing together continuous strips of fine glass fiber mats and applying a heat and pressure sensitive adhesive material in the form of fine fibers therebetween after which the fabricated strip may be cut in pieces of the desired length.

The mats from which the separators are formed are usually produced in a wide continuous sheet from which sections or strips of the desired width are cut and rolled. This eliminates the necessity of handling individual small pieces so that a continuous operation may be employed.

A further object of the invention is to provide a composite battery separator by laminating together sheets of fibrous glass and an organic filtering material.

A still further object of the invention is to provide a laminated battery separator which may be produced economically and is durable and rigid.

Other objects and features of novelty will become apparent during the course of the following description when considered in connection with the accompanying drawings in which.

Glass fiber mats suitable as battery mats may be made by attenuating streams of molten glass and winding the fibers formed thereby on a large drum. The fibers are traversed back and forth along the length of the drum as it rotates so that while the fibers forming each layer are substantially parallel the fibers of adjacent layers lie at an angle thereto. When the desired thickness of fibers has been wound on the drum they are removed in the form of a sheet by slitting the mat lengthwise of the drum. The mat after removal from the drum may be impregnated with a binder to preserve its integrity or the binder may be applied as the mat is formed.

Another method of producing glass fiber mats comprises engaging flowing streams of molten glass with a high velocity gaseous blast such as high pressure air or steam. The molten glass is thus attenuated into fine fibers by the force of the blast and collected on a traveling belt in the form of a continuous mat of heterogeneously arranged fibers. A suitable binder is then sprayed onto the fibers of the mat and the binder-impregnated mat is passed through a suitable curing oven. Upon leaving the oven the cured mat is then split longitudinally into strips of the desired width and wound into rolls. In this form the mat may be readily handled for shipping, storing or for further fabricating operations, such as those to be described presently.

Figure 1:
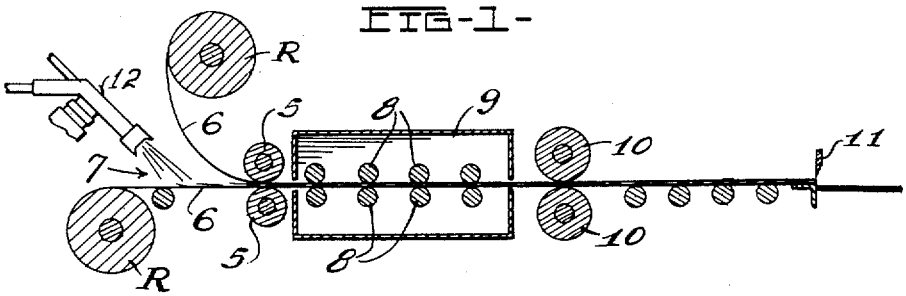
Figure 1 is a diagrammatic view of one form of apparatus by which the present invention may be practiced.

The apparatus shown in Figure 1 of the drawings includes a pair of initial pressing rolls 5 adapted to seal together a pair of continuous strips 6 of fine glass fiber mats fed from supply rolls R and to which an adhesive material is applied as at 7.

The mats thus laminated together then pass between sets of rolls 8 within a heating chamber 9 to soften the adhesive which is preferably a thermoplastic resinous material. The heat in the chamber softens the resin and promotes adhesion to the mat surfaces. As the combined strip issues from the chamber 9 it passes between chilling and gauging rolls 10 to set the adhesive. The rolls are preferably adjustable to regulate and control the final thicknesses of the laminate. After the strip has cooled it may be severed by a knife 11 into suitable lengths.

The present invention provides a layer or web of fine fibers of adhesive material or material which may be rendered adhesive, such as a synthetic resin, for bonding together sheets of mat from which battery separators are formed. The adhesive in this form is particularly adaptable for application on surfaces which are porous or are of a fibrous nature. By employing the adhesive material in the form of fine fibers a uniform layer may be produced which can be of any desired thickness. In the form of a thin web, a uniform dispersion of adhesive is obtained which provides a minimum amount of material by which the sheets are adhered together.

When the fibers 20 of adhesive material are applied as they are formed to the glass fiber mats, as shown in Figure 1, they may be in a "tacky" or sticky condition due to the presence of solvent. The next glass fiber mat 6 is then placed directly in contact with the fibers 20 and adhered thereto. The adhesion is then perfected by applying heat or pressure or both to the superposed mats. When heat is applied any residual solvent is volatilized and the fibers of adhesive material are softened to effect substantial adhesion between the sheets or mats with a minimum of fluid phase in the adhesive material.

It is also possible to produce the resinous fibers in dried sheet or web form which can be stacked or rolled and does not become adhesive until heat and pressure are applied. With most thermoplastic resins heating for only a short period and under a light pressure is all that is required to effect adhesion of the parts being joined. As shown in Figure 1 a manually operative spray gun 12 may be used or automatic apparatus may be employed and arranged to deposit the adhesive material in the form of fibers onto the mats.

The resin fibers form a web-like structure on the surface of the mat and have sufficient integrity that substantially no penetration of the mats takes place. In this manner the heterogeneously arranged resin fibers form a very thin layer which, while providing a strong inter-layer bond between the mats, does not decrease the porosity of the separator.

For the preferred resinous adhesive I have chosen butyl methacrylate although methyl or ethyl methacrylate are substantially equally suitable. These thermoplastic materials are non-oxidizing, acid resistant and otherwise inert in the presence of an electrolyte. These resins when combined with or dissolved in a suitable volatile solvent such as toluene may be sprayed in the form of very fine fibers. Other solvents may be methyl Cellosolve, diethyl phthalate, ketones, or acetone. In general solution concentrations of from 20% to 50% will be suitable for most fiber forming substances and conditions. These solvents rapidly volatilize upon contact with the air or at moderately elevated temperatures.

As an alternative to dissolving the resin in a suitable solvent, the fiber forming material may be heated until plastic or molten and the plastic or molten mass dispersed under pressure into fibers. These fibers upon coming into contact with a cool atmosphere solidify rapidly yet may readily be rendered adhesive upon application of heat.

The resinous material when mixed with solvent may be extruded from a gun of the conventional type (as shown in Figure 1) commonly used for spraying paint or other viscous liquids. This type of gun comprises generally a container for holding the fiber forming composition and from which it is forced under air pressure into the nozzle of the gun. One or more small orifices are provided in the nozzle for discharging the fluid, which due to its composition, takes the form of fibers as it leaves the nozzle.

When molten fiber forming material is to be blown heating means is provided at the gun to maintain the material in a fluid state.

Other resins which have been found suitable for use in the present invention are vinyl resins, Saran (vinylidene chloride), acrylic base resins and polystyrene and thermoplastic copolymers thereof.

Figure 2:
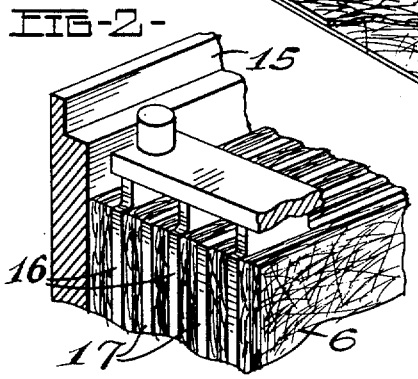
Figure 2 is a perspective view of a portion of a storage battery showing the present invention therein.

Figure 2 illustrates a portion of a storage battery 15 showing the positive plates 16 alternately arranged with a series of negative plates 17 and having separators formed according to the present invention placed therebetween. The separators may be made in any desired thickness according to the spacing of the plates and to facilitate assembly.

Figure 3:
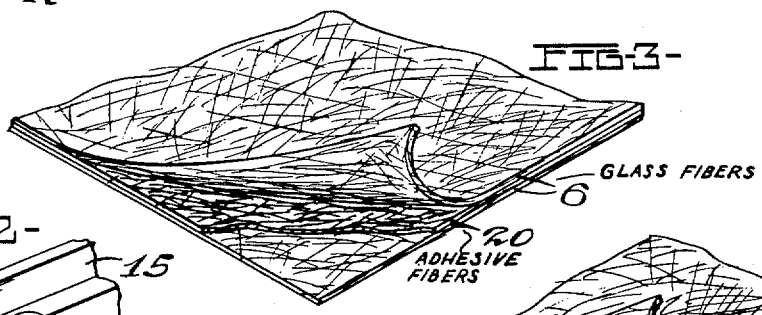
Figure 3 is a fragmentary perspective view of a storage battery separator formed in accordance with the present invention.

Figure 3 illustrates a portion of a separator with one of the glass fiber mats 6 rolled back to expose the layer 20 of fine fibers of adhesive material as previously described. In the preferred form of the invention this layer may have substantially no thickness since only sufficient fibers are necessary to provide a bond between the mats 6. These fibers while in the form of a very thin continuous mat do not change the porosity of the mats 6 when the bonding is completed.

Figure 4:
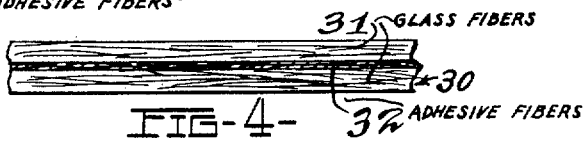
Figure 4 is a sectional view through a modified form of separator.
Figure 8:
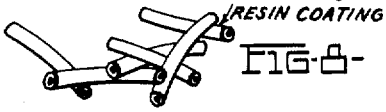
Figure 8 is a fragmentary view on an enlarged scale of a web of coated fibers formed in accordance with the present invention.

As a modification of this form of the invention I have shown in Figure 4 a separator 30 formed of a pair of mats 31 which are similar to the mats 6 previously described and which are adhered together by a layer of resinous fibers 32. The resinous fibers are sprayed on one of the mats during the fabricating operation until the desired thickness is reached. This layer is of substantially greater thickness than the mat of resinous fibers employed in the first-described form of the invention to bind the glass fiber mats together, and produces a relatively dense mat of fibers which when compressed in the presence of heat to effect adhesion forms a septum with a multiplicity of very fine pores extending therethrough. The pores in the septum are of such small size that treeing through the separator is prevented. This septum may also be formed by employing sheets of material in the form of preformed sheets of fine organic fibers, one such material being intermatted fine fibers of a styrene composition and known commercially as polystyrene fiber.

Figure 5:
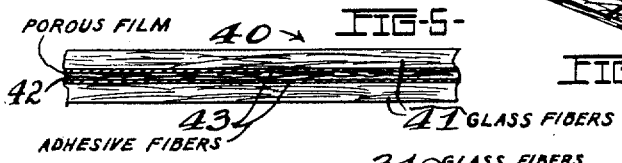
Figure 5 is a sectional view through a further modified form of the invention.

In the form of the invention shown in Figure 5 the separator 40 comprises a pair of glass fiber mats 41 one of which may be formed of relatively coarse fibers for installation adjacent the positive plate of the battery so that gases forming thereon may readily escape. A thin septum 42 or film of microporous material such as microporous natural or synthetic rubber, cellulose in sheet form, etc. is bonded between the mats by spraying a thin web 43 of resinous fibers on at least one of the surfaces to be joined. The septum material is adapted to be wet through by the electrolyte but is of such nature that treeing is not supported.

Figure 6:
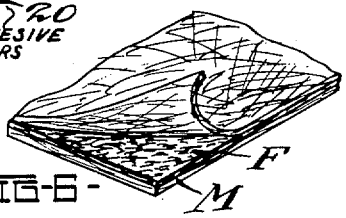
Figure 6 is a fragmentary perspective view of another form of the invention.

The invention as shown in Figure 6 contemplates applying the adhesive in the form of preformed short fibers by the process known as "flocking." The fibers F are shown applied to one of the mats M forming the separator. They may be organic fibers such as fibers of acetate rayon, acrylic base resins, or other synthetic thermoplastic fibers.

Fibers for this purpose are usually of from $\frac{1}{32}$ to $\frac{1}{8}$ inch in length and are formed by cutting or chopping longer fibers of the desired material. In practice, these short fibers are normally adhered by electrostatic or other means to a backing member previously coated with an adhesive to give the appearance of mohair or velvet. In the present application, however, such closely spaced and uniform relation of the short fibers is unnecessary and they may be satisfactorily applied by sifting or otherwise dispersing them into the atmosphere within a chamber through which the mat moves continuously. Since the fibers themselves are the adhesive, no adherent on the mat is necessary. The airborne fibers settle by gravity onto the surface of the moving mat in a haphazard although relatively uniform layer. The speed at which the mat is moved regulates the thickness of the layer of fine fibers so that the resulting density may be readily controlled.

It may at times be desirable to form the fibers for the adhering layer by coating fine glass fibers with one of the thermoplastic resins above mentioned, convert these resin-coated fibers to short lengths and apply the short fibers to one of the superposed mats. These resin-coated glass fibers provide greater body in the adhesive layer. The glass fibers may have a diameter of .00025 inch or be finer, say about 1 to 3 microns, and be provided with a thin coating of resin, the resin being in proportions of about 5 to 20% of the weight of the glass fibers.

Figure 7:
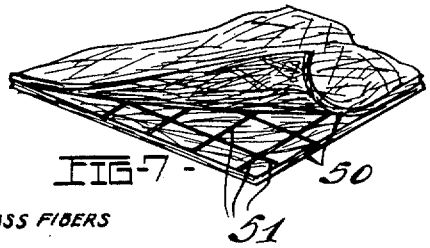
Figure 7 is a fragmentary perspective view of still another form of the invention.

In Figure 7 I have shown a further modification of the invention in which a pair of fibrous glass mats 50 are adhered together by means of a grid-like network formed of thermoplastic resinous filaments 51. The filaments 51 become adhesive when softened by heat and when cooled firmly adhere the sheets together. In this manner the porosity of the separator is not impaired so that the battery acid is permitted free circulation. Of the resinous materials previously mentioned Saran and polystyrene in filament form have been successfully employed in this form of the invention. If desired, the filaments of resin may be arranged in parallel relation in only one direction, that is, longitudinally of the strip or mat from which the separators are cut. This provides for a minimum of adhesive material and maximum porosity in the mat.

I claim:

1. A battery plate separator comprising sheets of mineral fibrous material and a porous layer of thermoplastic resinous material in the form of fibers, the fibers being closely assembled to provide interstices therebetween sufficiently small to prevent the passage therethrough of oxide particles loosened from the battery plates, thereby forming a septum interjacent said sheets, said resinous fibrous material securing said sheets of mineral fibrous material together by the material of the resinous fibrous material.

2. A storage battery plate separator comprising superposed porous layers of haphazardly arranged interbonded glass fibers, a microporous septum formed of haphazardly arranged fibers of thermoplastic synthetic resin interjacent said layers, said resin fibers being spaced apart in the septum sufficiently to provide porosity in the septum that permits the flow therethrough of battery electrolyte, and said resin fibers being adhered by the material of the resin fibers to adjoining faces of the superposed layers of glass fibers to bond said layers and septum to each other.

3. A storage battery plate separator comprising superposed layers of haphazardly arranged interbonded glass fibers, a web of fine glass fibers of a diameter less than about .00025 inch interjacent said layers, said fine glass fibers being of relatively short lengths and coated with a thermoplastic synthetic resin, said resin coatings on the fine glass fibers being adhered by the material of the resin to the fibers at the adjoining faces of said superposed layers to bond the layers together.

4. A battery plate separator comprising sheets of mineral fibrous material and a sheet of fluid pervious resinous material therebetween, and a low softening point thermoplastic resinous adhesive in the form of fibers adhering said sheets together by the material of the resin fibers.

5. A battery plate separator comprising fibrous glass sheets adhered together by an interposed layer of fine short glass fibers each coated with an adhesive thermoplastic synthetic resinous material.

6. A battery plate separator comprising superposed porous layers of haphazardly arranged mineral fibers, a microporous septum formed of haphazardly arranged fibers of thermoplastic resin interjacent said layers, said septum being pervious to battery electrolyte and said thermoplastic resin fibers adhering the adjoining layers of mineral fibers to the septum by the material of the resin fibers.

*7. A battery plate separator comprising a plurality of sheets of porous material bonded together, with an interjacent fibrous web of thermoplastic resinous material, at least one of said sheets being a highly porous sheet of glass fibers and another of said sheets being formed of a microporous resinous material in the form of fibers, said sheets adhered together by the resin fibers at the interface of said web and sheets.*

*8. A battery plate separator comprising a highly porous body of glass fibers and a microporous body of haphazardly arranged fibers of thermoplastic resinous material adhered to the body of glass fibers by the resin fibers at the interface of said bodies.*

JOHN A. GRANT.

References Cited in the file of this patent or the original patent

UNITED STATES PATENTS

| Number | Name | Date |
|---|---|---|
| 274,865 | Wallace | Mar. 27, 1883 |

(Other references on following page)

| Number | Name | Date |
|---|---|---|
| 2,015,006 | Ekisler | Sept. 17, 1935 |
| 2,035,766 | Schramm | Mar. 31, 1936 |
| 2,117,371 | Slayter | May 17, 1938 |
| 2,133,183 | Baird et al. | Oct. 11, 1938 |
| 2,155,016 | Kershaw | Apr. 18, 1939 |
| 2,176,427 | Kershaw | Oct. 17, 1939 |
| 2,178,566 | Dike et al. | Nov. 7, 1939 |
| 2,297,248 | Rudolph | Sept. 29, 1942 |
| 2,306,781 | Francis, Jr. | Dec. 29, 1942 |
| 2,311,613 | Slayter | Feb. 16, 1943 |
| 2,335,757 | Hall | May 30, 1943 |
| 2,336,745 | Manning | Dec. 14, 1943 |
| 2,336,797 | Maxwell | Dec. 14, 1943 |
| 2,344,614 | Hulse, Jr. | Mar. 21, 1944 |
| 2,357,392 | Francis | Sept. 5, 1944 |
| 2,374,540 | Hall | Apr. 24, 1945 |
| 2,391,515 | Richards et al. | Dec. 25, 1945 |
| 2,430,868 | Francis, Jr. | Nov. 18, 1947 |
| 2,454,100 | Slayter | Nov. 16, 1948 |

| Number | Name | Date |
|---|---|---|
| 2,465,493 | Strickhouser et al. | Mar. 29, 1949 |
| 2,478,186 | Gerber | Aug. 9, 1949 |
| 2,511,887 | Vinal | June 20, 1950 |

FOREIGN PATENTS

| Number | Country | Date |
|---|---|---|
| 763,866 | France | May 8, 1934 |
| 412,625 | Great Britain | July 2, 1934 |
| 412,884 | Great Britain | July 5, 1934 |
| 451,628 | Great Britain | Aug. 10, 1936 |
| 810,810 | France | Mar. 31, 1937 |
| 845,427 | France | Aug. 23, 1939 |
| 537,377 | Great Britain | June 19, 1941 |

OTHER REFERENCES

Vinal: "Storage Batteries," 3rd edition, 1940, page 53, John Wiley & Sons, Inc., New York.

Hackh: Chemical Dictionary, 3rd edition, 1944, page 744.